United States Patent [19]

Ohira

[11] Patent Number: 5,322,613
[45] Date of Patent: Jun. 21, 1994

[54] METHOD AND APPARATUS FOR MARKING ORTHODONTIC PRODUCTS

[75] Inventor: Kazuo Ohira, Namie, Japan

[73] Assignee: Tomy K.K., Tokyo, Japan

[21] Appl. No.: 979,739

[22] Filed: Nov. 23, 1992

[51] Int. Cl.[5] .......... C25F 3/02; C25D 11/02; C25D 17/00; B23H 9/06

[52] U.S. Cl. .................. 205/50; 205/52; 204/129.4; 204/129.65; 204/224 R; 204/224 M; 204/271; 433/2

[58] Field of Search ........... 204/129.1, 129.4, 129.65, 204/129.55, 224 M, 224 R, 271; 205/50, 52; 433/2

[56] References Cited

U.S. PATENT DOCUMENTS

| | | | |
|---|---|---|---|
| 2,482,486 | 9/1949 | Irish | 204/242 |
| 2,491,910 | 12/1949 | Schinske | 204/242 |
| 3,637,468 | 1/1972 | Icxi et al. | 204/224 R |
| 4,495,045 | 1/1985 | Jackson | 204/224 R |
| 4,879,015 | 11/1989 | Adamek et al. | 204/224 R |
| 5,160,589 | 11/1992 | Gionfriddo | 204/129.55 X |

OTHER PUBLICATIONS

New Epoch-making marking for Carvel Seals and Etchings METACOPY ®, Made By Metaletch Ltd. Of England (Standard Model 6100) 2065A pp. 1-7 (no date available).

*Primary Examiner*—Donald R. Valentine
*Attorney, Agent, or Firm*—Kenyon & Kenyon

[57] ABSTRACT

A method and apparatus are provided for marking orthodontic products. The method includes the steps of coupling the orthodontic product with the anode of a power source, placing an electrolyte in electrical contact with the cathode of the power source, and selectively exposing portions of the orthodontic product to be marked to the electrolyte. The apparatus includes a hand marker connected to the cathode of a power source. A sponge pad soaked with an electrolyte is attached to the hand marker. A workplate provided for holding the orthodontic product is coupled to the anode of the power source. A stencil is also provided to enable selective portions of the orthodontic product to be exposed to the electrolyte and thereby be marked.

26 Claims, 6 Drawing Sheets

FIG. 5A
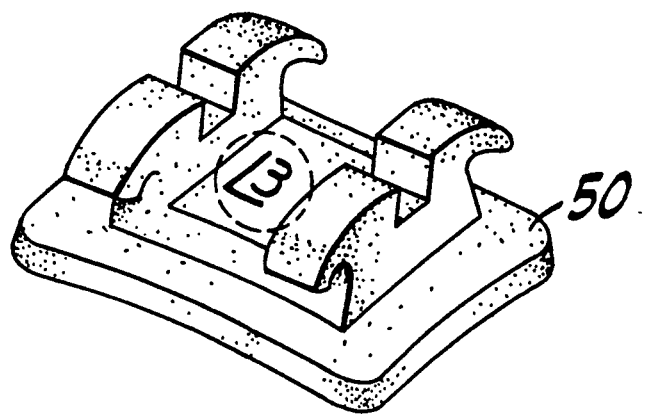
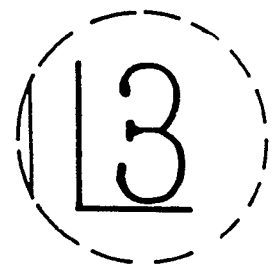
FIG. 5B
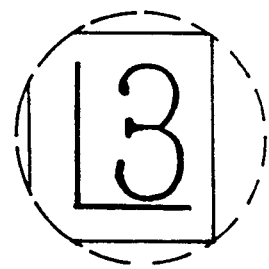
FIG. 5D
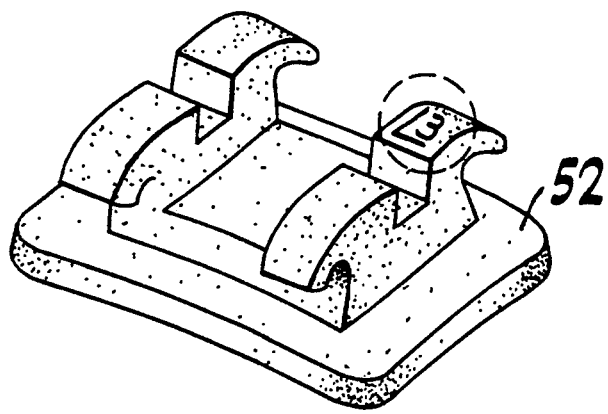
FIG. 5C

METHOD AND APPARATUS FOR MARKING ORTHODONTIC PRODUCTS

FIELD OF THE INVENTION

This invention relates generally to methods and apparatus for marking orthodontic products and, more particularly, to a method and apparatus for marking orthodontic products using electrolytic etching.

BACKGROUND INFORMATION

Methods and apparatus for marking orthodontic products are discussed below with reference to the marking of an orthodontic band, for example, that can be attached to teeth to straighten them. The band 5, shown in FIG. 3, is in the form of a ring that is modeled on a tooth.

Human teeth differ in shape depending on whether they are in the upper or lower jaw and whether they are on the right or left side. Also, the size of teeth varies from individual to individual. Because of the differences in tooth size and shape, it is necessary to use different orthodontic bands to match the teeth on which the bands are to be used. To enable orthodontic treatment to be performed properly and efficiently, it is therefore important that the bands be clearly marked with characters indicating whether the bands may be used on the upper or lower jaw and the right or left side along with characters indicating the size of the bands. Proper marking also prevents different bands from becoming mixed together when shipped from the factory.

Prior methods and apparatus for marking orthodontic products have failed to consider the effects of sterilization processes used to prevent infection with viruses like B-type hepatitis viruses and HIV viruses. The markings made on orthodontic products by the prior art is sometimes removed during sterilization by the rigorous heating conditions involved or by immersion of the products in disinfectants.

The size of orthodontic product such as an orthodontic band to be used on a patient is determined by trial of different sized products on the patient's teeth. As a result of the trials, the products are regularly contaminated with saliva and require frequent and repeated sterilization.

Prior methods of marking orthodontic products include printing characters on the products with ink and engraving characters on the products with laser beams. Markings made by printing tend to peel off when the orthodontic product is heated and when hydrochloric acid type disinfectants are applied to the product during sterilization. Characters produced by lasers are often thin and unreadable. In addition, marking with lasers is time consuming and requires substantial equipment.

It is difficult to accurately control the depth of the marking when markings are made using lasers. Moreover, with the use of lasers, band strength tends to decrease and the band becomes blunt from the heat generated by the process.

SUMMARY OF THE INVENTION

A method and apparatus are provided for marking orthodontic products. The method includes the steps of coupling the orthodontic product with the anode of a power source, placing an electrolyte in electrical contact with the cathode of the power source, and selectively exposing portions of the orthodontic product to be marked to the electrolyte.

The apparatus includes a hand marker connected to the cathode of a power source. A sponge pad soaked with an electrolyte is attached to the hand marker. A workplate provided for holding the orthodontic product is coupled to the anode of the power source. A stencil is also provided to enable selective portions of the orthodontic product to be exposed to the electrolyte and thereby be marked.

BRIEF DESCRIPTION OF THE DRAWINGS

FIG. 5A is a perspective view of an orthodontic bracket with a marking made thereon, illustrating an application of the present invention.

FIG. 5B is an enlarged view of the marking shown in FIG. 5A.

FIG. 5C is a perspective view of another orthodontic bracket with a marking made thereon, illustrating an application of the present invention.

FIG. 5D is an enlarged view of the marking shown in FIG. 5C.

DETAILED DESCRIPTION

Figure 4:
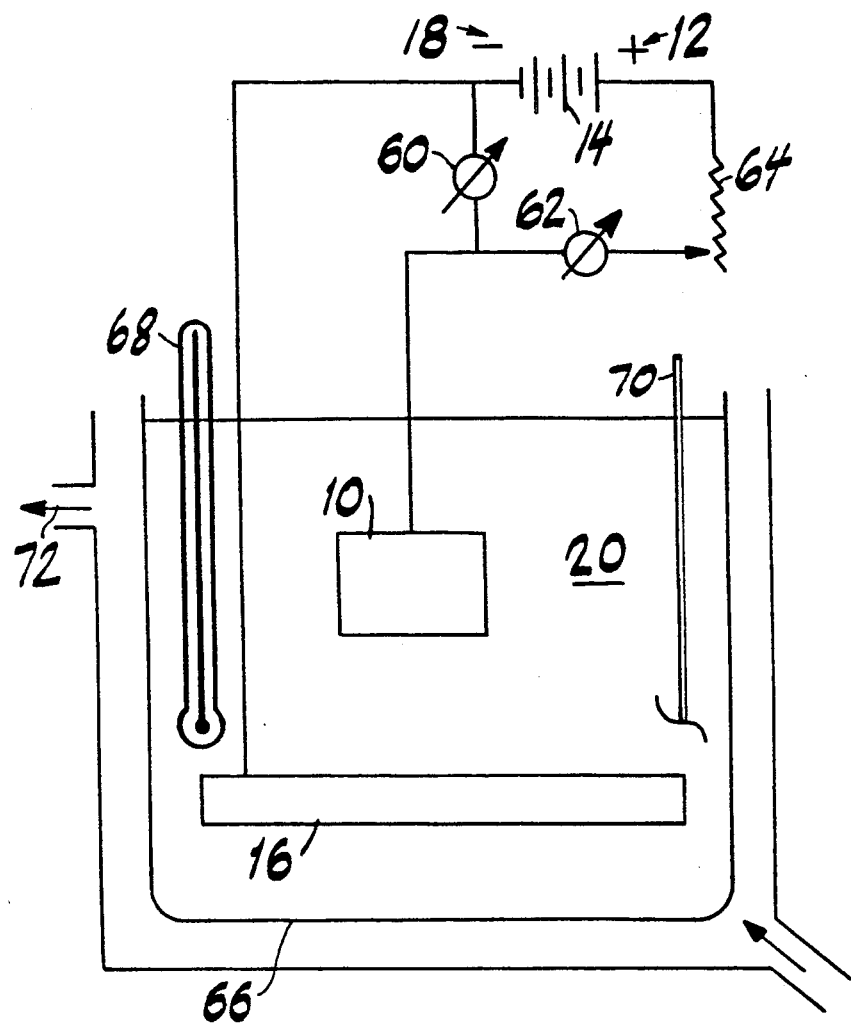
FIG. 4 is a schematic illustration of an electrolytic etching apparatus, illustrating the basic principles of the present invention.

Electrochemical or electrolytic etching is a known method of etching metal. FIG. 4 illustrates the basic principles of electrolytic etching. As shown, a sample 10 to be etched is connected to the anode 12 of a power supply 14 comprising a direct current power source in a circuit including a voltmeter 60, an ampere meter 62 and a resistor 64. The sample 10 along with a corresponding electrode 16 comprising a stainless plate connected to the cathode 18 of the power supply 14 are immersed in an etching liquid 20 comprising an electrolyte or electrolytic solution contained in an electrolyte vessel 66. Positive metal ions are dissolved into the electrolytic solution from the surface of the sample 10 by cathode etching. Direct etching of the sample is thereby performed. The electrolyte vessel 66 is provided with a thermometer 68 and an agitator 70. Cooling water indicated at 72 is circulated around the electrolyte vessel 66.

Figure 1:
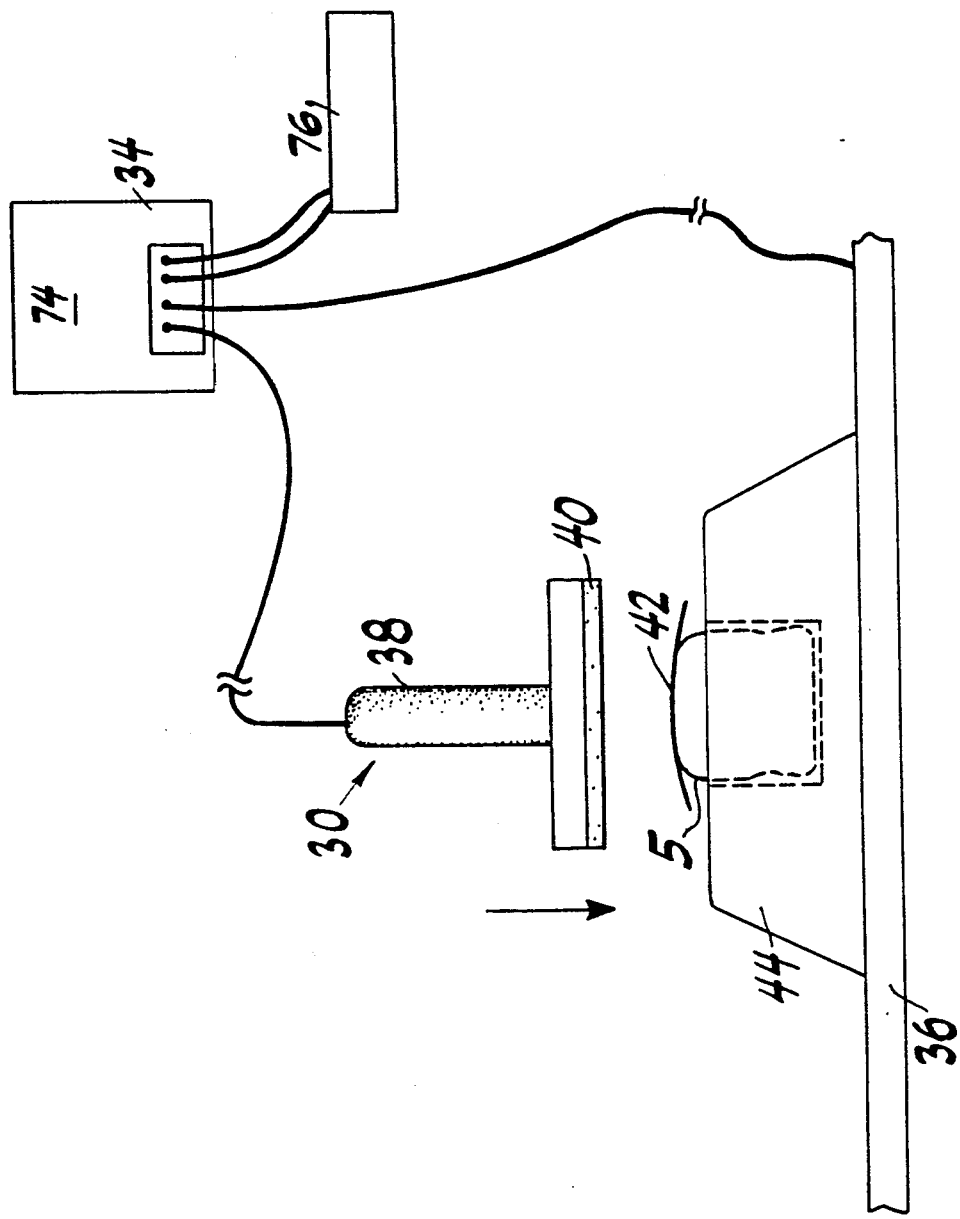
FIG. 1 is a schematic illustration of an apparatus for marking an orthodontic band in accordance with the present invention.

The present invention utilizes the principles of electrolytic etching for marking orthodontic products. An example of an apparatus 30 for marking orthodontic products in accordance with the present invention is schematically shown in FIG. 1. The apparatus 30 may be used to mark an orthodontic band 5. One terminal of a power supply 34 is coupled with a conductive metal plate or a work plate 36. The other terminal of the power supply 34 is coupled with a hand marker 38. The power supply 34 can be a direct current power supply or an alternating current power supply. The power supply 34 is provided with a variable resistor 74 and a voltmeter 76. A sponge pad 40 is attached to the hand marker 38. The sponge pad 40 is soaked with a weakly acidic electrolyte.

The characters to be marked on the band 5 are preferably punched into a stencil or stencil paper 42. This stencil paper 42 is preferably made from specially treated fine fibers such as teflon ® or nylon (polyamid). The character shapes are formed in the stencil paper 42 by the punching the paper. It is also possible to use a light sensitive or photographic negative for the stencil. In this case the characters may be formed by a typewriter and by other lettering means.

Figure 2:
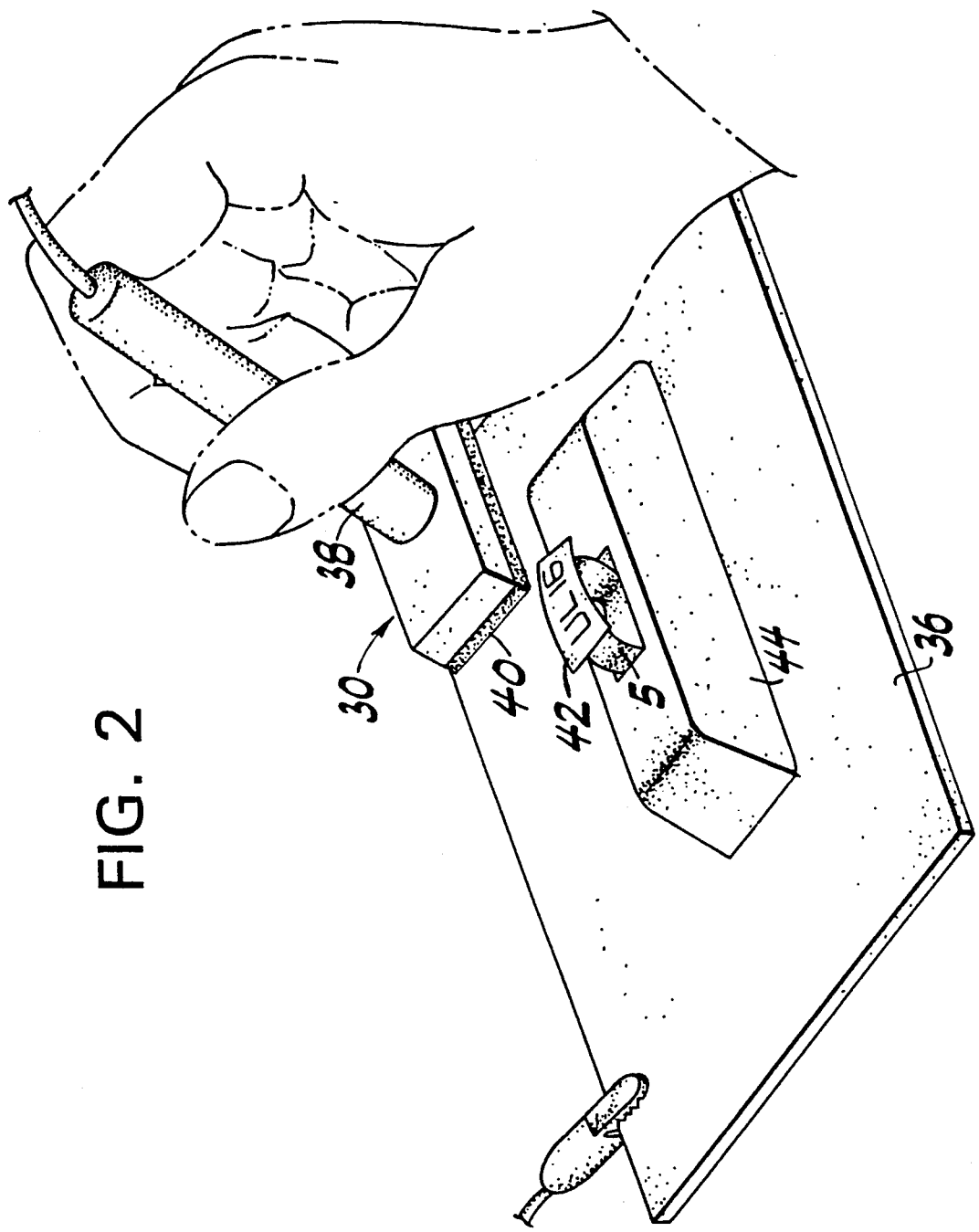
FIG. 2 is a perspective view of a portion of the apparatus shown in FIG. 1.
Figure 3:
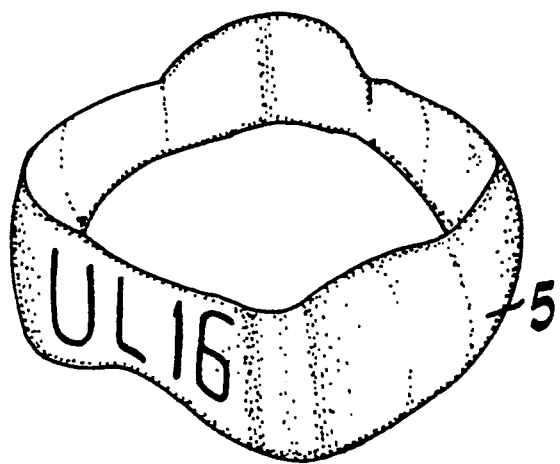
FIG. 3 is a perspective view of an orthodontic band.

As shown in FIG. 2, the band 5 being marked is positioned on the work plate 36. A stand 44 having a recess therein is provided on the work plate 36 for securely holding the band 5. The material used for the band 5 in this case is SUS304.

Next, the stencil paper 42 with its readable surface facing upward is positioned over the part of the band 5 to be marked. The sponge pad 40 of the hand marker 38 is first immersed in and soaked with an electrolyte solution, pad 40 is then lightly pressed over the stencil 42 for about one second. The hand marker 38 is rolled from side to side so that electrolyte is applied to the entire stencil on the curved surface of the band 5. The pressure applied by the hand marker 38 is 0.18 to 0.25 kg/cm$^2$.

Characters are etched on band 5 as the electrolyte with low current and voltage of 15 to 20 V is passed through the character holes in the stencil 42. Direct current from the power source 34 is applied at 0.1 A to 0.2 A.

Ordinarily, the thickness of the band 5 is 0.15 to 0.20 mm and the etching or marking depth is ideally 5 to 20 microns.

If the power source 34 is an alternating current power source, the color of the characters marked on the band 5 is black. Character marking can be made using direct current in the same manner with the anode of the power source coupled to work plate 36 and the cathode coupled to the hand marker 38. However, markings produced with direct current have a more white metallic luster. When alternating current is used, the metal is oxidized and the oxide adheres to the surface, becoming black. When direct current is used, etching occurs and the marking has a metallic luster.

Minute amounts of electrolyte adhering to the band 5 during the marking process may be removed by washing the band 5 with weak alkali water or with plain water to reduce the formation of rust.

The stencil 42 can be used repeatedly as long as the punched character shapes do not collapse or become ragged at the edges. The stencil 42 may be made from stencil paper or from other materials that are electrically insulated, have good pliability and can be easily punched without tearing.

One advantage of the present invention over the prior art is that the characters produced are clear with defined edges. Also, the characters do not peel off or lose their clarity when the orthodontic product is subjected to disinfectants or hot sterilization processes.

Another advantage of an apparatus in accordance with the present invention is that it is a generally simple apparatus that can be operated with only minimum amounts of labor.

A further advantage of the present invention is that it enables variation of marking color between black (with alternating current) and a nearly white metallic luster (with direct current). It is also possible to vary the marking color by varying the type of electrolyte used.

Figure 6:
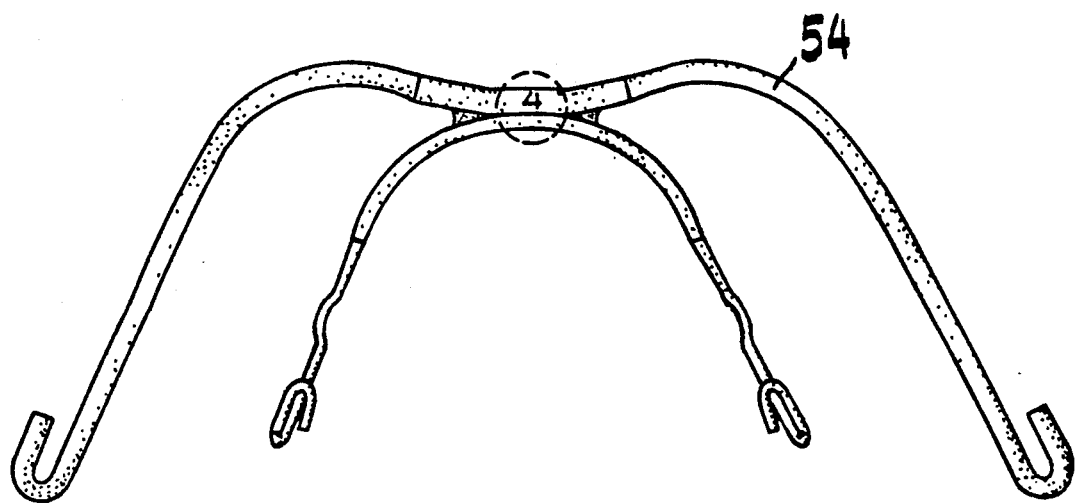
FIG. 6 is a top plan view of a face bow with a marking made thereon, illustrating an application of the present invention.
Figure 6A:
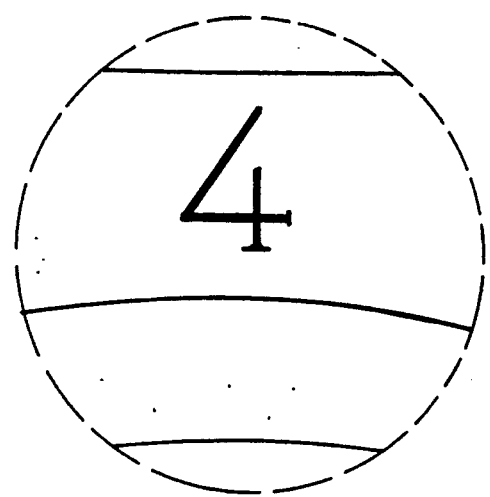
FIG. 6A is an enlarged view of the marking shown in FIG. 6.

While the above description relates to orthodontic bands, it should be noted that the present invention can be used for marking orthodontic products and devices other than orthodontic bands. For example, FIGS. 5 and 6 illustrate markings that can be made on orthodontic brackets 50 and 52 and a face bow 54.

Although the present invention has been described with respect to a specific embodiment, various changes and modifications may be suggested to one skilled in the art. The present invention encompasses such changes and modifications as fall within the scope of the appended claims.

What is claimed is:

1. A method of marking an orthodontic product, comprising the steps of:
   placing the orthodontic product in electrical contact with one terminal of a power source;
   placing a hand marker in electrical contact with the other terminal of the power source; the hand marker being in electrical contact with an electrolyte; and
   selectively exposing portions of the orthodontic product to be marked to the electrolyte.

2. The method of claim 1, wherein the power source is a direct current power source.

3. The method of claim 1, wherein the power source is an alternating current power source.

4. The method of claim 1, wherein said step of selectively exposing portions of the orthodontic product to the electrolyte comprises placing a stencil on the orthodontic product, the stencil having openings extending therethrough corresponding to the shape of characters to be marked on the orthodontic product, and directing the electrolyte to flow through the openings in the stencil.

5. The method of claim 1 wherein the orthodontic product is in electrical contact with the positive terminal of the power source and the electrolyte is in electrical contact with the negative terminal of the power source.

6. The method of claim 1, wherein the marker is attached to a sponge and the sponge is soaked with the electrolyte.

7. An orthodontic product having a surface thereof marked with electrolytically etched characters in accordance with the method of claim 4.

8. A method of marking an orthodontic product, comprising the steps of:
   coupling the orthodontic product with the anode of a power source;
   coupling a marker with the cathode of the power source, the marker being in contact with an electrolyte; and
   selectively exposing portions of the orthodontic product to be marked to the electrolyte.

9. The method of claim 8, wherein the power source is a direct current power source.

10. The method of claim 8, wherein the power source is an alternating current power source.

11. The method of claim 8, wherein said step of selectively exposing portions of the orthodontic product to the electrolyte comprises placing a stencil on the orthodontic product, the stencil having openings extending therethrough corresponding to the shape of characters to be marked on the orthodontic product, and directing the electrolyte to flow through the openings in the stencil.

12. An orthodontic product having a surface thereof marked with electrolytically etched characters in accordance with the method of claim 11.

13. An apparatus for marking an orthodontic product, comprising:
a hand marker in electrical contact with one terminal of a power supply, the hand marker being adapted for contact with an electrolyte;
means for placing the orthodontic product in electrical contact with the other terminal of the power supply; and
means for selectively exposing the orthodontic product to the electrolyte.

14. The apparatus of claim 13, wherein said one terminal of the power supply is the negative terminal and said other terminal of the power supply is the positive terminal.

15. The apparatus of claim 13, wherein the power supply is a direct current power supply.

16. The apparatus of claim 13, wherein the power supply is an alternating current power supply.

17. An apparatus for marking an orthodontic product, comprising:
a hand marker adapted to be coupled with the cathode of a power source, the and marker being adapted for contact with an electrolyte;
a workplate adapted to be coupled with the anode of the power source, the workplate also being adapted to receive the orthodontic product; and
a stencil for selectively exposing portions of the orthodontic product to the electrolyte.

18. The apparatus of claim 17, wherein the power source is a direct current power source.

19. The apparatus of claim 17, wherein the power source is an alternating current power source.

20. An apparatus for marking an orthodontic product, comprising:
a power source;
a hand marker coupled with the cathode of said power source;
a sponge pad attached to said hand marker, said sponge pad being adapted to hold an electrolyte;
a workplate coupled with the anode of said power source, said workplate being adapted to receive the orthodontic product; and
a stencil for selectively exposing portions of the orthodontic product to the electrolyte.

21. The apparatus of claim 20, wherein the power source is a direct current power source.

22. The apparatus of claim 20, wherein the power source is an alternating current power source.

23. A method of marking an orthodontic product, comprising the steps of:
placing the orthodontic product in electrical contact with one terminal of an alternating current power source;
placing an electrolyte in electrical contact with the other terminal of the alternating current power source; and
selectively exposing portions of the orthodontic product to be marked to the electrolyte.

24. A method of marking an orthodontic product, comprising the steps of:
placing the orthodontic product in electrical contact with one terminal of a power source;
placing an electrolyte in electrical contact with the other terminal of the power source; and
selectively exposing portions of the orthodontic product to be marked to the electrolyte by placing a stencil on the orthodontic product, the stencil having openings extending therethrough corresponding to the shape of characters to be marked on the orthodontic product, an directing the electrolyte to flow through the openings in the stencil.

25. A method of marking an orthodontic product, comprising the steps of:
placing the orthodontic product in electrical contact with one terminal of a power source;
placing an electrolyte in electrical contact with the other terminal of the power source by coupling a hand marker to said other terminal, attaching a sponge to the hand marker, and soaking the sponge with the electrolyte; and
selectively exposing portions of the orthodontic product to be marked to the electrolyte.

26. An apparatus for marking an orthodontic product, comprising:
means for placing an electrolyte in electrical contact with one terminal of an alternating current power supply;
means for placing the orthodontic product in electrical contact with the other terminal of the alternating current power supply; and
means for selectively exposing the orthodontic product to the electrolyte.

* * * * *